(12) United States Patent
Usui

(10) Patent No.: US 11,745,483 B2
(45) Date of Patent: Sep. 5, 2023

(54) STAND-UP POUCH FOR RETORT

(71) Applicant: THE NIPPON SYNTHETIC CHEMICAL INDUSTRY CO., LTD., Osaka (JP)

(72) Inventor: Shintaro Usui, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/566,873

(22) PCT Filed: Apr. 20, 2016

(86) PCT No.: PCT/JP2016/062566
§ 371 (c)(1),
(2) Date: Oct. 16, 2017

(87) PCT Pub. No.: WO2016/171192
PCT Pub. Date: Oct. 27, 2016

(65) Prior Publication Data
US 2018/0099493 A1  Apr. 12, 2018

(30) Foreign Application Priority Data

Apr. 20, 2015 (JP) .................................. 2015-086244
Apr. 20, 2015 (JP) .................................. 2015-086245

(51) Int. Cl.
*B65D 30/00* (2006.01)
*B32B 27/34* (2006.01)
(Continued)

(52) U.S. Cl.
CPC ............... *B32B 27/34* (2013.01); *B32B 7/12* (2013.01); *B32B 27/00* (2013.01); *B32B 27/08* (2013.01);
(Continued)

(58) Field of Classification Search
CPC .... B65D 31/005; B65D 85/70; B65D 75/008; B65D 81/24; B32B 2439/02; B32B 27/34;
(Continued)

(56) References Cited

U.S. PATENT DOCUMENTS 6,143,384 A    11/2000  Tanaka et al.
2012/0261607 A1  10/2012  Shimakage et al.
(Continued)

FOREIGN PATENT DOCUMENTS

CN    103203919 A    7/2013
JP    H04-059353 A   2/1992
(Continued)

OTHER PUBLICATIONS

EVAL F101B Technical Data Sheet (accessed 2021) (Year: 2021).*
(Continued)

*Primary Examiner* — Ellen S Hock
(74) *Attorney, Agent, or Firm* — GREENBLUM & BERNSTEIN, P.L.C.

(57) ABSTRACT

An object of the present invention is to provide a stand-up pouch for retort which has a high rate of gas barrier property recovery after retort processing and can stably retain high gas barrier properties. The stand-up pouch for retort of the invention comprises a laminate which comprises a base film and, disposed over one surface of the base film, a polyamide resin layer, a saponified ethylene-vinyl ester copolymer layer, and a heat-sealing resin layer, wherein the polyamide resin layer adjoins the saponified ethylene-vinyl ester copolymer layer.

6 Claims, 2 Drawing Sheets

(51) Int. Cl.
  *B32B 27/00*  (2006.01)
  *B32B 27/28*  (2006.01)
  *B65D 81/34*  (2006.01)
  *B65D 65/40*  (2006.01)
  *B32B 27/32*  (2006.01)
  *B65D 81/24*  (2006.01)
  *B32B 7/12*  (2006.01)
  *B32B 27/08*  (2006.01)
  *B32B 27/30*  (2006.01)
  *B32B 27/36*  (2006.01)
  *B32B 37/12*  (2006.01)
  *B65D 75/00*  (2006.01)

(52) U.S. Cl.
  CPC ............ *B32B 27/28* (2013.01); *B32B 27/306* (2013.01); *B32B 27/32* (2013.01); *B32B 27/36* (2013.01); *B32B 37/12* (2013.01); *B65D 65/40* (2013.01); *B65D 75/008* (2013.01); *B65D 81/24* (2013.01); *B65D 81/3415* (2013.01); *B32B 2250/04* (2013.01); *B32B 2250/05* (2013.01); *B32B 2250/24* (2013.01); *B32B 2307/306* (2013.01); *B32B 2307/308* (2013.01); *B32B 2307/31* (2013.01); *B32B 2307/7242* (2013.01); *B32B 2307/7244* (2013.01); *B32B 2307/7248* (2013.01); *B32B 2439/02* (2013.01); *B32B 2439/46* (2013.01); *B32B 2439/70* (2013.01)

(58) Field of Classification Search
  CPC ......... B32B 7/12; B32B 27/08; B32B 27/306; B32B 27/36; B32B 37/12; B32B 2250/04
  USPC .................................... 428/35.1, 34.7, 36.92
  See application file for complete search history.

(56) References Cited

U.S. PATENT DOCUMENTS

2014/0363655 A1  12/2014 Yoshida
2015/0251814 A1*  9/2015 Campanelli .......... B65D 31/005
                      426/127

FOREIGN PATENT DOCUMENTS

| JP | 04-216050 A | 8/1992 |
|---|---|---|
| JP | H06-238840 A | 8/1994 |
| JP | 2001-294279 | 10/2001 |
| JP | 2002-337885 A | 11/2002 |
| JP | 2004-136515 | 5/2004 |
| JP | 2005-178804 A | 7/2005 |
| JP | 2013-226825 A | 11/2013 |
| WO | 2014-054195 | 4/2014 |

OTHER PUBLICATIONS

International Search Report from Application No. PCT/JP2016/062566, dated Aug. 2, 2016.
Written Opinion of the International Searching Authority from Application No. PCT/JP2016/062566, dated Aug. 2, 2016.
European Search Report issued with respect to European Application No. 16783213.8, dated Nov. 19, 2018.
Japanese Office Action, Japanese patent Office, Application No. 2016-084783, dated Oct. 23, 2019.
Japanese Office Action, Japanese patent Office, Application No. 2016-084784, dated Oct. 23, 2019.
Explanation of the vinyl bag (packing material), Japan patent Office, (dated Jul. 23, 2013), [search on Oct. 9, 2019], Internet the <URL:https://www.yng.co.jp/vinyl/post-1716 to 1716.htmi>**online], 2013.
Chinese Office Action, Chinese Patent Office Application No. 201680035891.1, dated Apr. 18, 2019, with English translation.
Office Action dated Nov. 7, 2019 in corresponding Chinese patent application No. 201680035891.1 and machine translation thereof.
European Search Report, European Patent Office, Patent Application No. 16783213.8, dated Jun. 27, 2019.
Ethylene Vinyl Alcohol: A Review of Barrier Properties for Packaging Shelf Stable Foods, K. Khanah Mokwena et al., issued 2012, p. 640-650.
JP Office Action issued in JP 2016-084783 dated Jul. 14, 2020, English translation.
JP Office Action issued in JP 2016-084784 dated Jul. 14, 2020, English translation.
European Office Action issued in Application No. 16783213.8, dated Jun. 22, 2022, with English translation.

* cited by examiner

[Fig. 1]
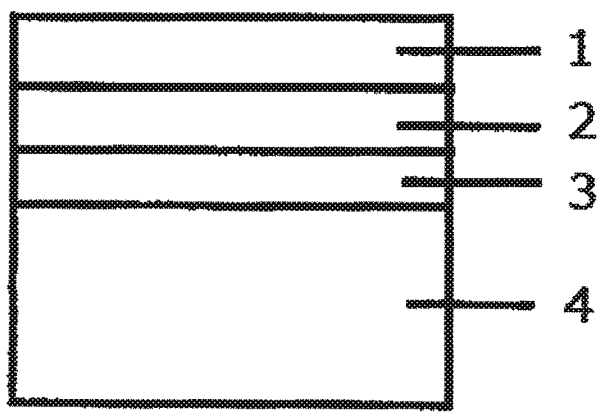
[Fig. 2]
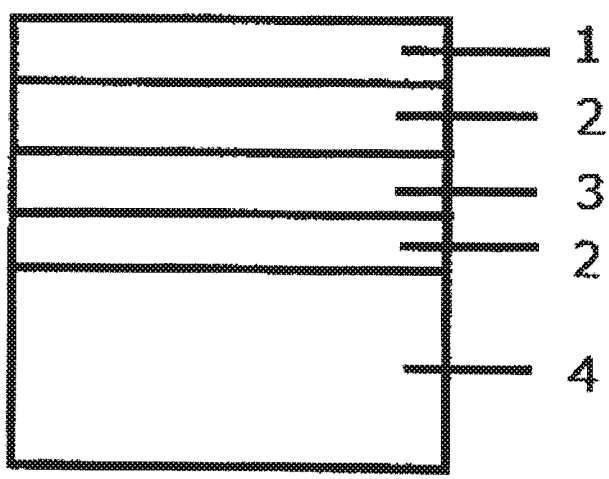

[Fig. 3]
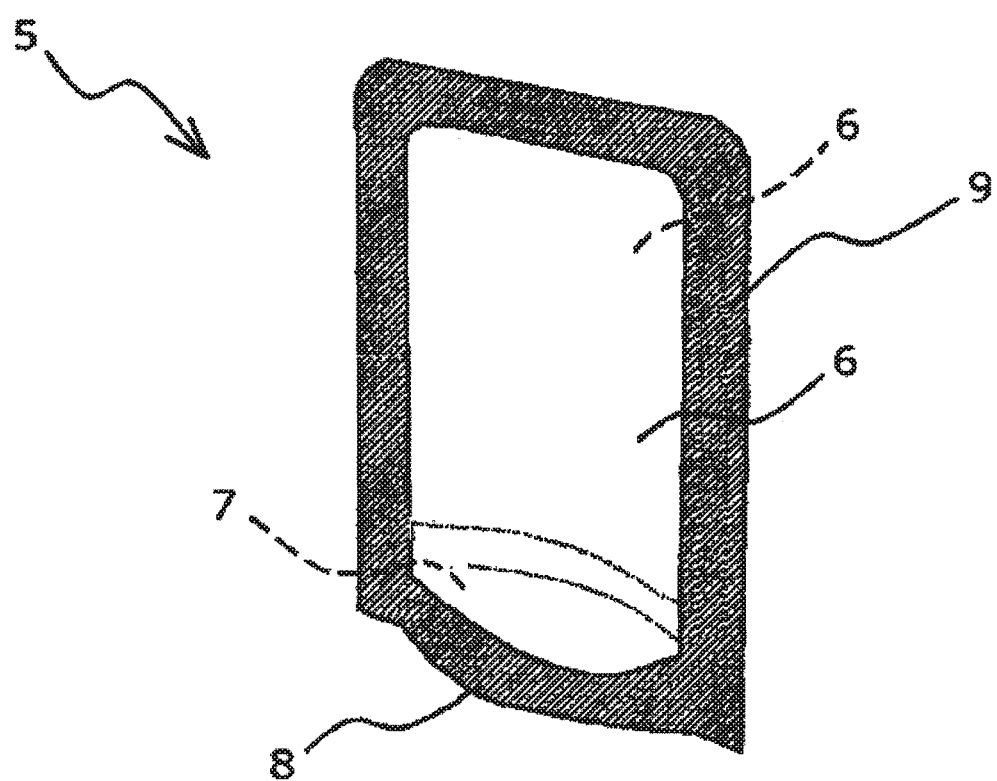

STAND-UP POUCH FOR RETORT

TECHNICAL FIELD

The present invention relates to a stand-up pouch for retort. More particularly, the invention relates to a stand-up pouch for retort which has a high rate of gas barrier property recovery after retort processing and can stably retain high gas barrier properties.

BACKGROUND ART

Packaging materials for foods, beverages, etc. are required to have functions such as retort resistance and heat resistance in order to prevent the packaging materials from dissolving away during thermal sterilization and prevent the contents from suffering a deterioration in flavor due to the dissolution.

Meanwhile, self-supporting bags (also called stand-up pouches) which are more lightweight and more suitable for volume reduction after use than the conventional bottles and cans are spreading as packaging containers for foods, etc. With respect to film materials for constituting stand-up pouches, there are a large number of configurations having both stillness which renders the pouches self-supporting after filling with contents and gas barrier properties for preventing the contents from deteriorating. As film materials having these properties, use has been made of laminated films composed of an aluminum foil and a polymer film.

However, the stand-up pouches including an aluminum foil as a main component have a problem, especially in food packaging materials, in that the consumers cannot use electric ovens for the pouches. Hence, demand for a stand-up pouch employing no aluminum foil is increasing.

Meanwhile, it has been proposed to use a film having a vapor-deposited coating of an inorganic oxide, e.g., silicon oxide or aluminum oxide, as a film base which brings about relatively high gas barrier properties without using an aluminum foil. However, such films having a vapor-deposited coating of an inorganic oxide, although excellent in terms of gas barrier property, are poor in flexing resistance and the like and are hence prone to come to have pinholes, which considerably impair the gas barrier properties.

As a means for overcoming the problem, it has been proposed to dispose a gas-barrier coating film on a surface of a film having a vapor-deposited coating of an inorganic oxide, e.g., silicon oxide or aluminum oxide, the gas-barrier coating film being obtained by a sol-gel method by the polycondensation of materials including one or more alkoxides and a vinyl alcohol resin (see, for example, Patent Document 1).

According to the technique disclosed in Patent Document 1, the gas-barrier coating film obtained through polycondensation by a sol-gel method and the vapor-deposited film of an inorganic oxide synergistically act to attain flexing resistance, and the packaging material hence stably retains high gas barrier properties and is excellent in terms of retort resistance, etc.

However, since it is necessary to separately dispose the gas-barrier coating film on a surface of the film having a vapor-deposited coating of an inorganic oxide, the process has poor production efficiency. In addition, strict production management is necessary. The proposed technique hence has had a problem, for example, in that the film is expensive.

In recent years, packaging containers are required to have higher functions. Required are oxygen barrier properties for preventing oxygen infiltration from the outside in order to inhibit oxidation, carbon dioxide barrier properties, and the function of serving as a barrier to various fragrant components. The unstretched polyolefin films to be used as inner layers (sealant side) when imparting a barrier function to multilayer films have poor gas barrier properties, and it is difficult to impart a barrier function thereto by coating or vapor deposition. Consequently, there are often cases where a barrier function is imparted to various films (polyester resins such as poly(ethylene terephthalate), polyamide resins, and stretched polyolefin resins) to be used on the outer-layer side.

PRIOR ART DOCUMENT

Patent Document

Patent Document 1: JP-A-2005-178804

SUMMARY OF THE INVENTION

Problem that the Invention is to Solve

In the case where a poly(vinyl alcohol) resin or saponified ethylene-vinyl ester copolymer (hereinafter saponified ethylene-vinyl ester copolymer is often referred to as "EVOH") which has an oxygen barrier function is used as such outer-layer-side films, there has been a problem in that the packaging containers have considerably reduced barrier properties immediately after retort processing and, hence, the contents, e.g., foods, of the packaging containers deteriorate in quality unless the barrier properties are quickly improved after the hot-water treatment.

Accordingly, an object of the invention is to provide, under such circumstances, a stand-up pouch for retort which has a high rate of gas barrier property recovery after retort processing and can stably retain high gas barrier properties.

Means for Solving the Problem

The present inventor diligently made investigations under such circumstances and, as a result, has discovered that in cases when a stand-up pouch for retort including a laminate including a polyamide resin layer, an EVOH layer, and a heat-sealing resin layer which have been disposed over one surface of a base film is configured so that the polyamide resin layer and the EVOH layer adjoin each other, then a stand-up pouch for retort which has a high rate of gas barrier property recovery after retort processing and can stably retain high gas barrier properties is obtained. The present invention has been thus completed.

Thus, the summary of the present invention is the following (1) to (9).

(1) A stand-up pouch for retort comprising a laminate which comprises a base film and, disposed over one surface of the base film, a polyamide resin layer, a saponified ethylene-vinyl ester copolymer layer, and a heat-sealing resin layer, wherein the polyamide resin layer adjoins the saponified ethylene-vinyl ester copolymer layer.

(2) The stand-up pouch for retort according to (1) above, comprising: the polyamide resin layer between the base film and the saponified ethylene-vinyl ester copolymer layer.

(3) The stand-up pouch for retort according to (2) above, wherein a ratio (Tc/Tb) between a thickness (Tc) of the saponified ethylene-vinyl ester copolymer layer and a thickness (Tb) of the polyamide resin layer is 0.02-10.

(4) The stand-up pouch for retort according to (1) above, wherein the polyamide resin layers adjoin both surfaces of the saponified ethylene-vinyl ester copolymer layer.
(5) The stand-up pouch for retort according to (4) above, wherein a ratio (Tc/Tbx) between a thickness (Tc) of the saponified ethylene-vinyl ester copolymer layer and a total thickness (Tbx) of the polyamide resin layers is 0.01-8.
(6) The stand-up pouch for retort according to any one of (1) to (5) above, wherein a thickness of the polyamide resin layer(s) is 1-80 μm.
(7) The stand-up pouch for retort according to any one of (1) to (6) above, wherein a thickness of the saponified ethylene-vinyl ester copolymer layer is 1-35 μm.
(8) The stand-up pouch for retort according to any one of (1) to (7) above, wherein a heat-sealing resin which constitutes the heat-sealing resin layer is polypropylene.
(9) The stand-up pouch for retort according to any one of (1) to (8) above, wherein the base film is a polyester resin film.

Effects of the Invention

The stand-up pouch for retort of the present invention is a stand-up pouch which includes a polyamide resin layer, an EVOH layer, and a heat-sealing resin layer over one surface of a base film and in which the polyamide resin layer adjoins the EVOH layer. This stand-up pouch has the effect of having a high rate of gas barrier property recovery after retort processing and being capable of stably retaining high gas barrier properties.

BRIEF DESCRIPTION OF THE DRAWINGS

FIG. 1 is a diagrammatic cross-sectional view of a laminate which constitutes a stand-up pouch for retort according to the invention.
FIG. 2 is a diagrammatic cross-sectional view of another laminate which constitutes a stand-up pouch for retort according to the invention.
FIG. 3 is a view which illustrates an example of the stand-up pouch of the invention.

MODES FOR CARRYING OUT THE INVENTION

The configuration of the present invention is explained below in detail. However, the following explanations are on desirable embodiments, and the invention should not be construed as being limited thereto.
In the present invention, a side of a stand-up pouch for retort where the contents are to be contained, i.e., the sealant side, is referred to as "inner side", and the reverse side is referred to as "outer side".
In the following explanations, terms such as "upper", "lower", "left-hand", and "right-hand" are terms used for convenience in accordance with directions in a drawing.
In general, the term "film" means a thin flat product which has an extremely small thickness for the length and width thereof and has an arbitrarily limited maximum thickness and which is supplied usually in the form of a roll, while the term "sheet" means a flat product generally having a small thickness for the length and width thereof (Japanese Industrial Standards JIS K6900). However, there is no clear boundary between the sheet and the film. In the present invention, since there is no need of distinguishing the two materials by word, any material called a "film" may include the meaning of a "sheet" and any material called a "sheet" may include the meaning of a "film".

The present invention is explained below in detail using the drawings, etc.
First, the laminate which constitutes the stand-up pouch for retort of the invention is explained while showing examples of the layer configuration thereof. FIG. 1 and FIG. 2 are diagrammatic cross-sectional views of laminates which constitute stand-up pouches for retort according to the invention.
The examples hereinabove show mere examples of the laminate constituting the stand-up pouch for retort according to the invention, and the invention should not be construed as being limited thereto.
For example, in the present invention, a laminate having any of various configurations can be designed and produced by superposing other resin layers, an adhesive resin layer, etc. at will in accordance with the intended use or application of the stand-up pouch, etc., although such layers are not shown in the drawings.

First Embodiment

As shown in FIG. 1, a first embodiment of the stand-up pouch for retort of the invention comprises a laminate which at least comprises a base film 1, a polyamide resin layer 2, a saponified ethylene-vinyl ester copolymer (EVOH) layer 3, and a heat-sealing resin layer 4, and has the polyamide resin layer 2, the EVOH layer 3, and the heat-sealing resin layer 4 over one surface of the base film 1.
In the first embodiment, it is important that the EVOH layer 3 should be used as a gas-barrier resin layer and that the polyamide resin layer 2 and the EVOH layer 3 adjoin each other. By disposing the polyamide resin layer 2 and the EVOH layer 3 so as to adjoin each other, the rate of gas barrier property recovery after retort processing is heightened. It is preferred to dispose the polyamide resin layer 2 between the base film 1 and the EVOH layer 3 because the rate of gas barrier property recovery after retort processing is heightened thereby.

Second Embodiment

As shown in FIG. 2, a second embodiment of the stand-up pouch for retort of the invention comprises a laminate which at least comprises a base film 1, polyamide resin layers 2, a saponified ethylene-vinyl ester copolymer (EVOH) layer 3, and a heat-sealing resin layer 4, and has the polyamide resin layers 2, the EVOH layer 3, and the heat-sealing resin layer 4 over one surface of the base film 1, the polyamides resin layers 2 having been disposed on both surfaces of the EVOH layer 3.
In the second embodiment, the EVOH layer 3 is used as a gas-barrier resin layer, and the polyamide resin layers adjoin both surfaces of the EVOH layer. By disposing polyamide resin layers so as to adjoin both surfaces of the EVOH layer, the rate of gas barrier property recovery after retort processing is heightened.
Due to the configuration, the stand-up pouch for retort of the invention prevents the contents from suffering a deterioration in flavor due to oxidation and enables the contents to be stored over a long period.
Next, the stand-up pouch for retort of the invention, which is obtained by forming a bag using a laminate such as those described above according to the invention, is explained. As the body and bottom of this stand-up pouch for retort, use can be made, for example, of the laminates shown in FIG. 1 and FIG. 2.

FIG. 3 is an explanatory drawing which illustrates one example of the stand-up pouch for retort of the invention. The stand-up pouch 5 of the invention is configured of two body sheets 6 and 6, respectively on the front side and the back side, and a bottom sheet 7. The body sheets 6 and the bottom sheet 7 are sheets having flexibility which have been cut, in desired sizes, out of a laminate according to the invention. The laminate according to the invention is disposed so that the resin film layer is located on the inner side, that is, the base film 1 is located on the outer side.

The bottom sheet 7 is inserted, in a folded state, between lower parts of the two body sheets 6 and 6, and the edges of the lower parts of the body sheets 6 and 6 are sealed to a peripheral edge part of the bottom sheet 7, thereby forming a bottom seal part 8. The left-hand and right-hand matching edges of the body sheets 6 and 6 are sealed to each other, thereby forming side seal parts 9. Thus, in the state of being filled with the contents, the bottom sheet 7 expands and the resultant bag turns into the stand-up pouch.

In the present invention, the stand-up pouch 5 in which the upper part is kept open is filled with the desired contents, e.g., a beverage or food, through the opening. Subsequently, the upside opening is heat-sealed to form a top seal part, etc., thereby producing a semifinished package. Thereafter, the semifinished package is subjected to retort processing such as a pressurizing thermal sterilization treatment. Thus, retort pouch foods having various forms can be produced.

The layers to be used in the laminates for constituting the stand-up pouch for retort of the invention are explained below.

<Base Film>

As the base film to be used in the invention, it is preferred to use a film or sheet of a resin which has excellent strength mechanically, physically, chemically, etc. and which is excellent in terms of piercing resistance, heat resistance, moisture resistance, pinhole resistance, transparency, etc., because this resin is a basic material for constituting the stand-up pouch for retort according to the invention.

Specifically, as the base film (A) for constituting the base film, use can be made of, for example, a film or sheet Obtained from any of polyester resins such as polyethylene terephthalate) and poly(ethylene naphthalate), polyamide resins such as various nylon resins, polyaramid resins, polypropylene resins, polyethylene resins, polycarbonate resins, polyacetal resins, fluororesins, other tough resins, and the like. Preferred of these is a polyester resin film obtained from a polyester resin.

As the resin film or sheet to be used, use can be made of an unstretched film, a stretched film which has undergone uniaxial or biaxial stretching, or the like.

The base film in the invention may have any thickness so long as the base film can retain the strength, piercing resistance, etc. Too large thicknesses thereof tend to result in an increase in cost. Conversely, too small thicknesses thereof tend to result in decreases in strength, piercing resistance, etc.

For the reason shown above, the thickness of the base film in the invention is preferably 10-100 μm, especially preferably 12-50 μm.

A printed layer can be suitably provided to the base film according to need. The printed layer is a layer formed from an ink obtained by mixing a solvent, a binder resin such as a urethane-, acrylic-, nitrocellulose-, or rubber-based binder, any of various pigments and extender pigments, a plasticizer, a drying agent, a stabilizer, etc. Characters, a design, etc. can be formed with the printed layer. As a printing method, use can be made of any of known printing methods such as, for example, offset printing, gravure printing, flexographic printing, silk screen printing, and ink-jet printing. By subjecting the surface of the base film beforehand to a corona treatment or an ozone treatment as a pretreatment, the adhesiveness of the printed layer can be improved. Usually, a printed layer is formed on the inner surface of the base film.

<Polyamide Resin Layer>

As the polyamide resin (B) for constituting the polyamide resin layer to be used in invention, a known polyamide resin can be used. Examples of the polyamide resin (B) include homopolymers such as polycaproamide (nylon-6), poly(ω-aminoheptanoic acid) (nylon-7), poly(ω-aminononanoic acid) (nylon-9), polyundecanamide (nylon-11), and polylauryllactam (nylon-12). Examples of copolyamide resins include aliphatic polyamides such as poly(ethylenediamineadipamide) (nylon-26), poly(tetramethyleneadipamide) (nylon-46), poly(hexamethyleneadipamide) (nylon-66), poly(hexamethylenesebacamide) (nylon-610), poly (hexamethylenedodecamide) (nylon-612), poly(octamethyleneadipamide) (nylon-86), poly(decamethyleneadipamide) (nylon-108), caprolactam/lauryllactam copolymers (nylon-6/12), caprolactam/ω-aminononanoic acid copolymers (nylon-6/9), caprolactam/hexamethylenediammonium adipate copolymers (nylon-6/66), lauryllactam/hexamethylenediammonium adipate copolymers (nylon-12/66), ethylenediamineadipamide/hexamethylenediammonium adipate copolymers (nylon-26/66), caprolactam/hexamethylenediammonium adipate/hexamethylenediammonium sebacate copolymers (nylon-66/610), and ethyleneammonium adipate/hexamethylenediammonium adipate/hexamethylenediammonium sebacate copolymers (nylon-6/66/610), aromatic polyamides such as poly(hexamethyleneisophthalamide), poly(hexamethyleneterephthalamide), poly(m-xylyleneadipamide), hexamethyleneisophthalamide/terephthalamide copolymers, poly(p-phenyleneterephthalamide), and poly(p-phenylene-3,4'-diphenyl ether terephthalamide), amorphous polyamides, and terminal-modified polyamides obtained by modifying the terminals of these polyamide resins with the carboxyl groups or amino groups of methylbenzylamine, m-xylenediamine, etc.

In the first embodiment, the thickness (Tb) of the polyamide resin layer is preferably 1-80 μm, more preferably 15-60 μm, especially preferably 20-40 μm.

This polyamide resin layer may be constituted of a single layer or a plurality of layers. In the case of a plurality of layers, the thicknesses thereof are not limited so long as the overall thickness of this polyamide resin layer is within that range.

In the case of the second embodiment, the laminate includes polyamide resin layers which adjoin both surfaces of the EVOH layer, which will be described later, as shown in FIG. 2. These polyamide resin layers each have a thickness of preferably 1-80 μm, more preferably 10-60 μm, especially preferably 15-40 μm.

The total thickness (Tbx) of the polyamide resin layers is preferably 2-120 μm, more preferably 10-90 μm, especially preferably 20-60 μm.

The multiple polyamide resin layers may be ones constituted of the same polyamide resin (B), or may be ones constituted of different polyamide resins (B).

In case where the thickness of the polyamide resin layer(s) is too small, the rate of gas barrier property recovery after retort processing tends to be too low. In case where the thickness thereof is too large, this results in too large an overall thickness of the stand-up pouch and this stand-up pouch tends to have too high stiffness and show reduced openability when practically filled with a food or the like.

<EVOH Layer>

The EVOH (C) for constituting the EVOH layer to be used in the invention usually is a resin obtained by saponifying a copolymer of ethylene and a vinyl ester monomer (ethylene-vinyl ester copolymer), and is a water-insoluble thermoplastic resin. The polymerization may be conducted using any known polymerization method such as, for example, solution polymerization, suspension polymerization, or emulsion polymerization. In general, however, use is made of solution polymerization in which a lower alcohol such as methanol is used as the solvent. Saponification of the ethylene-vinyl ester copolymer obtained can also be performed by a known method. The EVOH thus produced mainly includes structural units derived from ethylene and vinyl-alcohol structural units and contains a slight amount of vinyl-ester structural units remaining unsaponified.

Vinyl acetate is representatively used as the vinyl ester monomer from the standpoints of availability on the market and the satisfactory efficiency of treatment for impurity removal during the production. Examples of other vinyl ester monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate and aromatic vinyl esters such as vinyl benzoate. Aliphatic vinyl esters each having usually 3-20 carbon atoms, preferably 4-10 carbon atoms, especially preferably 4-7 carbon atoms, can be used. Although one of these is usually used alone, two or more thereof may be simultaneously used according to need.

The ethylene content of the EVOH (C), in terms of the value determined in accordance with ISO 14663, is preferably 20-60% by mole, more preferably 25-50% by mole, especially preferably 25-35% by mole. In case where the content thereof is too low, this EVOH tends to have reduced high-humidity gas-barrier properties and reduced melt moldability. Conversely, too high contents thereof tend to result in reduced gas barrier properties.

The degree of saponification of the vinyl ester component in the EVOH (C), in terms of the value determined in accordance with TIS K6726 (the EVOH is examined as an even solution in water/methanol solvent), is preferably 90-100% by mole, more preferably 95-100% by mole, especially preferably 99-100% by mole. In case where the degree of saponification thereof is too low, there is a tendency that the gas barrier properties, thermal stability, moisture stability, etc. decrease.

The melt flow rate (MFR) of the EVOH (C) (210° C.; load, 2,160 g) is preferably 0.5-100 g/10 min, more preferably 1-50 g/10 min, especially preferably 3-35 g/10 min. In case where the MFR thereof is too high, this EVOH tends to have reduced film-forming properties. In case where the MFR thereof is too low, this EVOH tends to have too high a melt viscosity and be difficult to melt-extrude.

The EVOH (C) to be used in the invention may further contain structural units derived from the comonomers shown below, besides ethylene structural units and vinyl-alcohol structural units (including unsaponified vinyl-ester structural units). Examples of the comonomers include: α-olefins such as propylene, isobutene, α-octene, α-dodecene, and α-octadecene; hydroxy-containing α-olefins such as 3-buten-1-ol, 4-penten-1-ol, and 3-butene-1,2-diol and derivatives of hydroxy-containing α-olefins, such as the esters and acylation products of those hydroxy-containing α-olefins; unsaturated carboxylic acids or salts, partial alkyl esters, complete alkyl esters, nitriles, amides or anhydrides thereof; unsaturated sulfonic acids or salts thereof; vinylsilane compounds; vinyl chloride; and styrene.

Also usable are EVOH resins which have undergone an "after modification" such as urethane formation, acetalization, cyanoethylation, or oxyalkylene formation.

Preferred of the modifications shown above are EVOHs having primary hydroxyl groups which have been incorporated into the side chain by copolymerization, since these EVOHs have satisfactory formability in stretching, vacuum/air-pressure forming, etc. Preferred of these is an EVOH having 1,2-diol structures in side chains.

The EVOH (C) to be used in the invention may contain ingredients which are generally mixed into EVOHs, so long as these ingredients do not lessen the effects of the invention. Examples of such ingredients include a heat stabilizer, antioxidant, antistatic agent, colorant, ultraviolet absorber, lubricant, plasticizer, light stabilizer, surfactant, antibacterial, drying agent, antiblocking agent, flame retardant, crosslinking agent, hardener, blowing agent, nucleator, antifogging agent, additive for biodegradation, silane coupling agent, and oxygen absorber.

Examples of the heat stabilizer include the following substances used for improving various properties including thermal stability during melt molding: organic acids such as acetic acid, propionic acid, butyric acid, lauric acid, stearic acid, oleic acid, and behenic acid or salts thereof such as alkali metal salts (sodium, potassium, etc.), alkaline-earth metal salts (calcium, magnesium, etc.), and the zinc salts; and inorganic acids such as sulfuric acid, sulfurous acid, carbonic acid, phosphoric acid, and boric acid or salts thereof such as alkali metal salts (sodium, potassium, etc.), alkaline-earth metal salts (calcium, magnesium, etc.), and the zinc salts.

The EVOH (C) to be used in the invention may be a mixture thereof with a different EVOH. Examples of the different EVOH include one which differs in ethylene content, one which differs in the degree of saponification, one which differs in melt flow rate (MFR) (210° C.; load, 2,160 g), one which differs in other comonomer ingredients, and one which differs in modification amount (e.g., one which differs in the content of 1,2-diol structural units).

In the case of producing a packaging material for packages to be subjected to a hot-water treatment, such as retort pouch foods, it is preferred to use an EVOH resin composition containing a polyamide resin. The amide bonds in the polyamide resin are capable of interacting with the hydroxyl groups and/or ester groups of the EVOH (C) to thereby form a network structure. Thus, the EVOH (C) can be prevented from dissolving away during retort processing.

As the polyamide resin, a known polyamide resin can be used. For example, the same resin as the polyamide resin (B) described above can be used.

The thickness (Tc) of the EVOH layer is preferably 1-35 μm, more preferably 5-25 μm, especially preferably 10-20 μm. In case where the thickness thereof is too small, this EVOH layer tends to have reduced gas barrier properties. In case where the thickness thereof is too large, the rate of gas barrier property recovery after retort processing tends to decrease.

<Heat-Sealing Resin Layer>

The heat-sealing resin layer to be used in the invention may be any resin layer which thermally melts and is fused to itself. As the heat-sealing resin (D) constituting the heat-sealing resin layer, use can be made, for example, of a film, sheet, or coating film of a resin constituted of one or more of polyethylene, polypropylene, ethylene-vinyl acetate copolymers, ionomer resins, ethylene-ethyl acrylate copolymers, ethylene-acrylic acid copolymers, ethylene-methacrylic acid copolymers, ethylene-propylene copolymers, methylpentene polymers, acid-modified polyolefin resins obtained by modifying polyolefin resins such as polyethylene and polypropylene with acrylic acid, methacrylic acid, maleic anhydride, fumaric acid, or another unsaturated carboxylic acid, etc.

Preferred of these is linear low-density polyethylene (LLDPE) or polypropylene, which each give films that themselves have stiffness, from the standpoint of imparting sufficient self-supporting properties to the stand-up pouch. From the standpoint of inhibiting dissolution after retort processing performed at a relatively high temperature (120° C. or higher), polypropylene is especially preferred.

The heat-sealing resin layer to be used in the invention can be constituted of a single layer or a plurality of layers. The thickness of the heat-sealing resin layer is preferably 30-300 μm, more preferably 35-200 μm, even more preferably 40-100 μm. In case where the thickness thereof is too small, the seal parts tend to have reduced sealing strength. In case where the thickness thereof is too large, this stand-up pouch tends to have too high stiffness and show reduced openability when filled with a food or the like.

The laminate for constituting the stand-up pouch for retort of the invention may have layers other than the base film, polyamide resin layer(s), EVOH layer, and heat-sealing resin layer described above. For example, the laminate may have any layers such as another resin layer and an adhesive resin layer.

<Another Resin Layer>

As the resin for constituting another resin layer, a known resin can be used. Specifically, as such a resin, use can be made of a polyester resin such as poly(ethylene terephthalate) or poly(ethylene naphthalate), a polyamide resin such as any of various nylon resins, a polyaramid resin, a polypropylene resin, a polyethylene resin, a polycarbonate resin, a polyacetal resin, a fluororesin, or the like.

The thickness of the other resin layer is preferably 1-100 μm, more preferably 5-90 μm, especially preferably 10-80 μm.

<Adhesive Resin Layer>

As the adhesive resin for constituting the adhesive resin layer, a known adhesive resin can be used. Representative examples of the adhesive resin include a carboxyl-containing modified polyolefin polymer obtained by chemically bonding an unsaturated carboxylic acid or the anhydride thereof to a polyolefin resin by addition reaction, graft reaction, etc. Examples thereof include polyethylene modified by grafting with maleic anhydride, polypropylene modified by grafting with maleic anhydride, ethylene-propylene (block and random) copolymers modified by grafting with maleic anhydride, ethylene-ethyl acrylate copolymers modified by grafting with maleic anhydride, ethylene-vinyl acetate copolymers modified by grafting with maleic anhydride, polycycloolefin resins modified with maleic anhydride, and polyolefin resins modified by grafting with maleic anhydride. One polymer selected from among these or a mixture of two or more thereof can be used.

The thickness of the adhesive resin layer is preferably 1-30 μm, preferably 2-20 μm, especially preferably 3-10 μm.

<Methods for Producing the Laminates>

Next, methods for producing the laminates are explained.

The laminate in the first embodiment of the invention includes the base film, polyamide resin layer, EVOH layer, and heat-sealing resin layer.

The laminate in the first embodiment of the invention is obtained, for example, by (1) a method in which a multilayer film including a polyamide resin layer, an EVOH layer, and a heat-sealing resin layer is laminated to a base film, (2) a method in which a polyamide resin layer, an EVOH layer, and a heat-sealing layer are successively laminated to a base film, or 3) a method in which any two or more of a base film, a polyamide resin layer, an EVOH layer, and a heat-sealing resin layer are laminated beforehand and the remaining layer or layers are then laminated. Preferred of these is method (1), which requires only one laminating operation, from the standpoint that the cost of laminating can be reduced.

First, an explanation is given on a method for producing the multilayer film including a polyamide resin layer, an EVOH layer, and a heat-scaling resin layer, in particular, the multilayer film including a polyamide resin layer/EVOH layer/heat-sealing resin layer which have been laminated in this order.

Laminating for producing the EVOH-layer-containing multilayer film to be used in the invention can be conducted by melt molding, wet laminating, dry laminating, solvent-free laminating, extrusion laminating, coextrusion laminating, inflation, etc. Preferred of these is melt molding, from the environmental standpoint that no solvent is used and from the cost standpoint that there is no need of performing laminating in a separate step. As a method for the melt molding, a known technique can be employed. Examples thereof include extrusion molding (T-die extrusion, tubular-film extrusion, blow molding, melt spinning, profile extrusion, etc.) and injection molding. A temperature for the melt molding is suitably selected usually from the range of 150-300° C.

Subsequently, methods for laminating the base film to the multilayer film are explained.

For laminating the base film to the multilayer film, a laminating method for producing an ordinary packaging material can be employed. For example, the laminating can be conducted by wet laminating, dry laminating, solvent-free laminating, extrusion laminating, coextrusion laminating, inflation, or the like.

When performing the laminating in the invention, the surface of the base laminated can be subjected at will to a pretreatment such as a corona treatment, ozone treatment, or flame treatment, according to need.

When performing extrusion laminating in this method, polyethylene, polypropylene, an ethylene-vinyl acetate copolymer, an ionomer resin, an ethylene-ethyl acrylate copolymer, an ethylene-acrylic acid copolymer, an ethylene-methacrylic acid copolymer, an ethylene-propylene copolymer, a methylpentene polymer, an acid-modified polyolefin resin obtained by modifying a polyolefin resin such as polyethylene or polypropylene with acrylic acid, methacrylic acid, maleic anhydride, fumaric acid, or another unsaturated carboxylic acid, or another resin can be used as a resin for melt-extrusion laminating.

In this case, an anchor coating agent such as, for example, an isocyanate compound, polyethyleneimine compound, or another compound, can be used at will as an adhesion aid.

When performing dry laminating in the invention, use can be made of a solvent-based, water-based, emulsion type, or another adhesive for laminating which includes a vinyl, acrylic, polyurethane, polyamide, polyester, epoxy, or another compound as a main component of the vehicle.

A configuration including a plurality of base films and a multilayer film (e.g., base film/base film/multilayer film) is possible. Also possible is a configuration including a base film/multilayer film/base film. When laminating base films to each other, this laminating can be conducted by the same method as described above.

The laminate in the second embodiment may be produced by the same methods as for the laminate in the first embodiment, except that this laminate is configured so that a first polyamide resin layer and a second polyamide resin layer are disposed respectively on both surfaces of an EVOH layer.

In cases when a polyamide resin (B) to be disposed on the base film side is referred to as polyamide resin (B1) and a polyamide resin (B) to be disposed on the heat-sealing resin layer side is referred to as polyamide resin (B2), then the laminate in the second embodiment includes a first polyamide resin layer constituted of the polyamide resin (B1), an EVOH layer, a second polyamide resin layer constituted of the polyamide resin (B2), and a heat-sealing resin layer in this order from the base film side.

The laminate in the second embodiment is obtained, for example, by (1) a method in which a multilayer film including a first polyamide resin layer, an EVOH layer, a second polyamide resin layer, and a heat-sealing resin layer is laminated to a base film, (2) a method in which a first polyamide resin layer, an EVOH layer, a second polyamide resin layer, and a heat-sealing layer are successively laminated to a base film, or (3) a method in which any two or more of a base film, a first polyamide resin layer, an EVOH layer, a second polyamide resin layer, and a heat-sealing resin layer are laminated beforehand and the remaining layer or layers are then laminated. Preferred of these is method (1), which requires only one laminating operation, from the standpoint that the cost of laminating can be reduced.

The multilayer film including a first polyamide resin layer, an EVOH layer, a second polyamide resin layer, and a heat-sealing layer, in particular, the multilayer film including a first polyamide resin layer/EVOH layer/second polyamide resin layer/heat-sealing layer which have been superposed in this order, can be produced by the same method as in the first embodiment described above.

<Layer Thicknesses>

In the invention, the overall thickness of the base-film-containing laminate for the stand-up pouch is preferably 50-200 μm, especially preferably 60-190 μm, more preferably 70-180 μm. In case where the overall thickness thereof is too small, there is a tendency that the stiffness for maintaining self-supporting properties is not obtained. In case where the overall thickness thereof is too large, this laminate tends to have too high stiffness and the stand-up pouch tends to have reduced openability when actually filled with a food, etc. The term "openability" in the invention means such a property that in cases when a gas, e.g., air, is blown against the opening of the packaging bag in preparation for filling with stuff to be packed, the opening readily opens and is capable of accommodating itself to automatic packaging.

In this invention, the thickness of the multilayer film which includes a polyamide resin layer, an EVOH layer, and a heat-sealing resin layer and which is for constituting the laminate for the stand-up pouch cannot be unconditionally specified because the thickness thereof varies depending on applications, package forms, required properties, etc. However, the thickness thereof is preferably 1-150 μm, more preferably 5-145 μm, especially preferably 10-140 μm.

In the first embodiment, the ratio (Tc/Tb) between the thickness (Tc) of the EVOH layer and the thickness (Tb) of the polyamide resin (B) layer is preferably 0.02-10, more preferably 0.05-5, especially preferably 0.1-0.9, most preferably 0.15-0.6.

In case where the thickness ratio is too small, the gas barrier properties tend to decrease. In case where the thickness ratio is too large, the recovery of gas barrier properties after retort processing tends to be slow.

In the case where each layer is composed of a plurality of layers, the sum of the thicknesses of the layers may be within that range.

In the second embodiment, the ratio (Tc/Tb1) between the thickness (Tc) of the EVOH layer and the thickness (Tb1) of the first polyamide resin layer is preferably 0.02-10, more preferably 0.05-5, especially preferably 0.1-2, most preferably 0.15-1.

In case where the thickness ratio is too small, the gas barrier properties tend to decrease. In case where the thickness ratio is too large, the recovery of gas barrier properties after retort processing tends to be slow.

The ratio (Tc/Tb2) between the thickness (Tc) of the EVOH (C) layer and the thickness (Tb2) of the second polyamide resin layer is preferably 0.02-10, more preferably 0.05-5, especially preferably 0.1-2, most preferably 0.15-1.

In case where the thickness ratio is too small, the gas barrier properties tend to decrease. In case where the thickness ratio is too large, the recovery of gas barrier properties after retort processing tends to be slow.

The ratio (Tc/Tbx) between the thickness (Tc) of the EVOH layer and the total thickness (Tbx) of the polyamide resin layers is preferably 0.01-8, more preferably 0.05-4, especially preferably 0.1-1, most preferably 0.15-0.6.

In case where the thickness ratio is too small, the gas barrier properties tend to decrease. In case where the thickness ratio is too large, the recovery of gas barrier properties after retort processing tends to be slow.

A specific process for producing the stand-up pouch of the invention is explained next.

<Process for Producing the Stand-Up Pouch>

One surface of a base film is subjected, for example, to gravure printing using a gravure ink containing a urethane resin as a binder. The multilayer film including an EVOH layer is laminated to the printed surface of the base film by dry laminating, with a two-pack type curable urethane adhesive interposed therebetween. In this case, the adhesive is applied to the whole printed surface before the laminating, thereby forming a laminate. The resultant laminate has a configuration including base film/printed layer/multilayer film.

Next, in order to form a stand-up pouch, the laminate is slit into given, widths to form body sheets and a bottom sheet. As shown in FIG. 3, the two body sheets 6 and 6 are stacked so that the multilayer films face each other, and the bottom sheet 7 is inserted between lower parts of the two body sheets 6 and 6. The bottom and the left-hand and right-hand edges are sealed to respectively form a bottom seal part 8 and left-hand and right-hand side seal parts 9. Thus, a stand-up pouch 5 is formed in which the top, i.e., the upper part, is open. In this operation, a plurality of void parts which are unsealed portions each surrounded by the seal part are formed along the longitudinal direction in at least one of the side seal parts 9.

Next, air is forced into the void parts. A method for forming confined-air parts is explained briefly. An injection hole for forcing air is formed in a longitudinal-direction end of each void part formed. This injection hole is not limited so long as the hole pierces the body sheet 6. Another injection nozzle is fitted into the injection hole in order to force air into the void part through the injection hole. While forcing air into the void part, a portion of the void part which is slightly apart from the injection hole is sealed at the time when a desired air amount has been reached, thereby forming a confined-air part. Thereafter, the injection hole is sealed. Namely, the injection hole is filled with the heat-sealing layer to form a confined-air part.

Next, the bottom sheet of the packaging bag in which the top part is open is expanded, and contents are filled into the bag. Thereafter, the top part is sealed to form a top seal part, thereby sealing up the bag. Thus, a stand-up pouch 5 of the invention is formed. Although confined-air parts were formed in one of the side seal parts 9, confined-air parts may be formed in both side seal parts 9. The self-supporting properties can be further improved thereby.

The stand-up pouch thus produced has improved self-supporting properties, and is free from deformations such as, for example, bending of the side seals or buckling of the packaging bag, even after the contents have been partly consumed to reduce the amount thereof. Nevertheless, the packaging bag can be bent between confined-air parts and, hence, can be stored in a reduced volume. Furthermore, in the case where the packaging bag is discarded after use, the packaging bag can be bent between confined-air parts and folded into a reduced volume.

Conditions for retort processing the stand-up pouch for retort of the invention are explained.

A method usable for retort processing in the present invention is, for example, as follows. An ordinary tank for retort processing is used. The treatment temperature depends on the contents and the packaging container, and cannot be unconditionally specified. However, the treatment temperature is generally 110-180° C., preferably 120-150° C. Meanwhile, the treatment period varies depending on the contents, packaging container, temperature of retort processing, etc., and cannot be unconditionally specified. However, the stand-up pouch is heat-treated with pressurizing for generally 20-60 minutes, preferably 30-60 minutes.

Thus, in the present invention, the contents can be thermally sterilized or can be thermally sterilized and cooked or the like, by the retort processing described above.

Next, a process for producing a retort pouch food using the stand-up pouch for retort according to the invention is described.

The peripheral edge parts on three sides of the laminate produced above are sealed by heat sealing or the like, and contents are then filled thereinto through the opening. Subsequently, the opening at the upper end is sealed up by heat sealing or the like, thereby producing a semifinished package employing the stand-up pouch for retort according to the invention. Thereafter, the semifinished package is subjected to a heat treatment such as retort processing. Thus, a retort pouch food can be produced using the stand-up pouch for retort according to the invention.

Examples of the contents to be filled into the packaging bag which constitutes the stand-up pouch for retort according to the invention include various kinds of beverages and foods including cooked feeds, fish-paste products, frozen foods, stewed foods, rice cake, soup, seasonings, potable water, and others. Specific examples include various kinds of beverages and foods such as curries, stews, soup, meat source, hamburg steaks, meatballs, shaomai, oden, liquid foods such as rice porridge, jellylike foods, seasonings, water, and others.

Thus, the stand-up pouch of the invention can stably retain both gas barrier properties after retort processing and high gas barrier properties, and is excellent in terms of suitability for filling and packaging the contents, retention of the quality of the contents, etc. This stand-up pouch according to the invention is useful as a stand-up pouch for retort.

EXAMPLES

The present invention is explained below in detail by reference to Examples, but the invention should not be construed as being limited to the following Examples unless the invention departs from the spirit thereof.

In the Examples and Comparative Examples, "parts" means parts by weight.

Example 1-1

As a base film (A), use was made of a stretched poly (ethylene terephthalate) film manufactured by Futamura Chemical Co., Ltd. (grade, FE2001A; thickness, 12 μm).

As a polyamide resin (B), use was made of nylon-6 "UBE Nylon" (grade: 1020), manufactured by Ube Industries, Ltd.

As an EVOH (C), use was made of an EVOH having an ethylene content of 29.4% by mole, a degree of saponification of 99.7% by mole, and an MFR of 5.2 g/10 min (230° C.; load, 2,160 g).

As a heat-scaling resin (D), use was made of polypropylene "Novatec PP" (grade: BC6DRF), manufactured by Japan Polypropylene Corp.

As an adhesive resin, use was made of polypropylene-based adhesive resin "Modic" (grade: 614V), manufactured by Mitsubishi Chemical Corp.

[Production of Laminate]

First, a multilayer film was produced, and this multilayer film was laminated to the base film to thereby produce a laminate.

<Production of Multilayer Film>

Films were formed by the T-die extrusion method to obtain a multilayer film composed of [polyamide resin layer (10 μm)]/[EVOH layer (20 μm)]/[adhesive resin layer (5 μm)]/[heat-sealing resin layer (65 μm)].

(Film Forming Conditions)

Polyamide resin layer: 40-mm Φ single-screw extruder (barrel temperature: 220° C.)

EVOH layer: 40-mm Φ single-screw extruder (barrel temperature: 230° C.)

Adhesive resin layer: 32-mm Φ single-screw extruder (barrel temperature; 200° C.)

Heat-sealing resin layer: 40-mm Φ single-screw extruder (barrel temperature: 210° C.)

Die: feed block die (die temperature: 230° C.)

Cooling roll temperature: 50° C.

<Laminating of Multilayer Film and Base Film>

The base film and the multilayer film obtained above were dry-laminated to each other using an adhesive for dry laminating (main component "TM-242A", manufactured by Toyo-Moton, Ltd.; hardener "CAT-RT37L", manufactured by Toyo-Moton, Ltd.; the main component/the hardener/ethyl acetate=17/1.5/19.2), thereby producing a laminate.

(Laminating Conditions)

Laminating in a 20° C. environment, followed by 48-hour aging at 40° C.

The laminate obtained was subjected to the following evaluation.

[Gas Barrier Property After Bending Test]

A piece having a square shape of 10 cm×10 cm was cut out of the laminate obtained above, and the piece was folded into two and then unfolded. This laminate piece was examined for oxygen permeability (23° C.; inside, 100% RH; outside, 50% RH) using an oxygen gas permeability measuring device (OX-TRAM 2/21, manufactured by MOCON Inc.). The results thereof are shown in Table 1.

Comparative Example 1-1

In place of the laminate used in Example 1-1, a laminate was obtained from a PET film (12 μm) coated with vapor-deposited alumina (GL•ARH, manufactured by Toppan Printing Co., Ltd.), a nylon (15 μm) (Emblem ONMB-RT, manufactured by Unichika. Ltd.), and biaxially stretched polypropylene (60 μm) (Torayfan NOZK-207, manufactured by Toray Advanced Film Co., Ltd.) by performing dry laminating between the PET and the nylon and between the nylon and the polypropylene using the same adhesive for dry laminating as in Example 1-1. The laminate obtained was evaluated in the same manner as in Example 1-1. The results thereof are shown in Table 1.

TABLE 1

| | Oxygen permeability (cc/m$^2$day · atm) | |
|---|---|---|
| | Before bending test | After bending test |
| Example 1-1 | 0.5 | 0.5 |
| Comparative Example 1-1 | 0.1 | 0.6 |

It can be seen from the results that the laminate which included a polyamide resin layer, EVOH layer, and heat-sealing resin layer that had been disposed over one surface of the base film and in which the polyamide resin layer and the EVOH layer adjoined each other showed no change in oxygen permeability through the bending test and stably showed high gas barrier properties.

Example 1-2

As a base film (A), use was made of a stretched poly(ethylene terephthalate) film manufactured by Futamura Chemical Co., Ltd. (grade, FE2001A; thickness, 12 μm).
As a polyamide resin (B), use was made of nylon-6 "UBE Nylon" (grade: 1022B), manufactured by Ube Industries, Ltd.
As an EVOH (C), use was made of an EVOH having an ethylene content of 29.4% by mole, a degree of saponification of 99.7% by mole, and an MHZ of 5.2 g/10 min (230° C.; load, 2,160 g).
As a heat-sealing resin (D), use was made of polypropylene "Novatec PP" (grade: BC6DRF), manufactured by Japan. Polypropylene Corp.
As an adhesive resin, use was made of polypropylene-based adhesive resin "Plexar" (grade: 6002), manufactured by LyondellBasell NV.

[Production of Laminate]
First, a multilayer film was produced, and this multilayer film was laminated to the base film to thereby produce a laminate (see Table 2).
<Production of Multilayer Film>
Films were formed by the T-die extrusion method to obtain a multilayer film composed of [polyamide resin layer (20 μm)]/[EVOH layer (20 μm)]/[adhesive resin layer (5 μm)]/[heat-sealing resin layer (55 μm)].

(Film Forming Conditions)
Polyamide resin layer: 40-mm Φ single-screw extruder (barrel temperature: 220° C.)
EVOH layer: 40-mm Φ single-screw extruder (barrel temperature: 230° C.)
Adhesive resin layer: 32-mm Φ single-screw extruder (barrel temperature: 200° C.)
Heat-sealing resin layer: 40-mm Φ single-screw extruder (barrel temperature: 210° C.)
Die: feed block die (die temperature: 230° C.)
Cooling roll temperature: 50° C.
<Laminating of Multilayer Film and Base Film>
The base film and the multilayer film obtained above were dry-laminated to each other using the same adhesive for dry laminating as in Example 1-1, thereby producing a laminate.
(Laminating Conditions)
Laminating in a 20° C. environment, followed by 48-hour aging at 40° C.
The laminate obtained was subjected to the following evaluation.
[Gas Barrier Property After Hot-Water Treatment]
A piece having a square shape of 10 cm×10 cm was cut out of the laminate obtained above, and the piece was subjected to 30-minute retort processing at 120° C. using a device for retort processing (manufactured by Hisaka Works, Ltd.). Thereafter, the laminate piece was taken out and examined for oxygen permeability (23° C.; inside, 100% RH; outside, 50% RH) using an oxygen gas permeability measuring device (OX-TRAM 2/21, manufactured by MOCON Inc.).

Example 1-3

A laminate was produced in the same manner as in Example 1-2, except that the thicknesses of the polyamide resin layer and EVOH layer were changed to the thicknesses shown in Table 2. This laminate was evaluated in the same manner as in Example 1-2.

Example 1-4

A laminate was produced in the same manner as in Example 1-2, except that the thicknesses of the polyamide resin layer and EVOH layer and the layer configuration were changed to the thickness and the configuration as shown in Table 3. This laminate was evaluated in the same manner as in Example 1-2.
The films were formed under the following film forming conditions.
(Film Forming Conditions)
Polyamide resin layer: 40-mm Φ single-screw extruder (barrel temperature: 220° C.)
EVOH layer: 40-mm Φ single-screw extruder (barrel temperature: 230° C.)
Adhesive resin layer: 32-mm Φ single-screw extruder (barrel temperature: 200° C.)
Heat-sealing resin layer: 40-mm Φ single-screw extruder (barrel temperature: 210° C.)
Die: feed block die (die temperature: 230° C.)
Cooling roll temperature: 50° C.

Example 1-5

A laminate was produced in the same manner as in Example 1-4, except that the thicknesses of the EVOH layer and polyamide resin layer were changed to the thicknesses shown in Table 3. This laminate was evaluated in the same manner as in Example 1-4.

Comparative Example 1-2

A laminate was produced in the same manner as in Example 1-2, except that the thicknesses of the EVOH layer and polyamide resin layer and the layer configuration were changed to the thickness and the configuration as shown in Table 4, and that polypropylene ("Novatec PP" (grade: BC6DRF), manufactured by Japan Polypropylene Corp.) was used as another resin layer. This laminate was evaluated in the same manner as in Example 1-2.

The films were formed under the following conditions.
(Film Forming Conditions)
  EVOH layer: 40-mm Φ single-screw extruder (barrel temperature: 230° C.)
  Adhesive resin layer: 32-mm Φ single-screw extruder (barrel temperature: 200° C.)
  Another resin layer: 40-mm Φ single-screw extruder (barrel temperature: 210° C.)
  Heat-sealing resin layer: 40-mm Φ single-screw extruder (barrel temperature: 210° C.)
  Die: 4-resin 5-layer type feed block die (die temperature: 230° C.)
  Cooling roll temperature: 50° C.

The results of evaluation of Examples 1-2 to 1-5 and Comparative Example 1-2 are summarized in Table 5.

TABLE 2

| | Base film (μm) | Polyamide resin layer (μm) | EVOH layer (μm) | Adhesive resin layer (μm) | Heat-sealing resin layer (μm) |
|---|---|---|---|---|---|
| Example 1-2 | 12 | 20 | 20 | 5 | 55 |
| Example 1-3 | 12 | 30 | 10 | 5 | 55 |

TABLE 3

| | Base film (μm) | Polyamide resin layer (μm) | EVOH layer (μm) | Polyamide resin layer (μm) | Adhesive resin layer (μm) | Heat-sealing resin layer (μm) |
|---|---|---|---|---|---|---|
| Example 1-4 | 12 | 10 | 20 | 10 | 5 | 55 |
| Example 1-5 | 12 | 5 | 20 | 5 | 5 | 55 |

TABLE 4

| | Base film (μm) | EVOH layer (μm) | Adhesive resin layer (μm) | Another resin layer (μm) | Adhesive resin layer (μm) | Heat-sealing resin layer (μm) |
|---|---|---|---|---|---|---|
| Comparative Example 1-2 | 12 | 40 | 10 | 10 | 10 | 30 |

TABLE 5

| | Oxygen permeability (cc/m²day · atm) | | | | |
|---|---|---|---|---|---|
| | After 6 hr | After 24 hr | After 36 hr | After 48 hr | After 60 hr |
| Example 1-2 | 88.8 | 58.2 | 14.4 | 4.4 | 2.4 |
| Example 1-3 | 86.0 | 35.3 | 9.7 | 5.0 | 4.6 |
| Example 1-4 | 97.1 | 67.7 | 18.3 | 5.0 | 3.2 |
| Example 1-5 | 99.7 | 80.3 | 32.5 | 8.4 | 4.7 |
| Comparative Example 1-2 | 115.8 | 97.6 | 63.1 | 22.4 | 4.9 |

It can be seen from the results that in cases when a polyamide resin layer has been disposed so as to adjoin an EVOH layer, the rate of gas barrier property recovery after retort processing is high.

A comparison between Example 1-2 and Example 1-4 shows that even when the total thickness of the polyamide resin layer(s) was the same, the disposition of polyamide resin layers respectively on both surfaces of the EVOH layer resulted in an increase in the rate of gas barrier property recovery after retort processing.

A comparison between Example 1-4 and Example 1-5 shows that the disposition of polyamide resin layers having a larger thickness as the polyamide resin layers adjoining the EVOH layer resulted in an increase in the rate of gas barrier property recovery after retort processing.

A comparison between Example 1-3 and Example 1-2 shows that in laminates including an EVOH layer and an adjoining polyamide resin layer, the reduction in the ratio (Tc/Tb) between the EVOH layer and the polyamide resin layer resulted in an increase in the rate of gas barrier property recovery after retort processing.

Example 2-1

As a base film (A), use was made of a stretched poly(ethylene terephthalate) film manufactured by Futamura Chemical Co., Ltd. (grade, FE2001A; thickness, 12 μm).

As polyamide resins (B1) and (B2), use was made of nylon-6 "UBE Nylon" (grade: 1020), manufactured by Ube Industries, Ltd.

As an EVOH (C), use was made of an EVOH having an ethylene content of 29.4% by mole, a degree of saponification of 993% by mole, and an MFR of 5.2 g/10 min (230° C.; load, 2,160 g).

As a heat-sealing resin (D), use was made of polypropylene "Novatec PP" (grade: BC6DRF), manufactured by Japan Polypropylene Corp.

As an adhesive resin, use was made of polypropylene-based adhesive resin "Modic" (grade: 614V), manufactured by Mitsubishi Chemical Corp.

[Production of Laminate]

First, a multilayer film was produced, and this multilayer film was laminated to the base film to thereby produce a laminate.

<Production of Multilayer Film>

Films were formed by the T-die extrusion method to obtain a multilayer film composed of [first polyamide resin layer (10 μm) formed from polyamide resin (B1)]/[EVOH layer (20 μm)]/[second polyamide resin layer (10 μm) formed from polyamide resin (B2)]/[adhesive resin layer (5 μm)]/[heat-sealing resin layer (55 μm)].

(Film Forming Conditions)
  First polyamide resin layer: 40-mm Φ single-screw extruder (barrel temperature: 220° C.)
  EVOH layer: 40-mm Φ single-screw extruder (barrel temperature: 230° C.)

Second polyamide resin layer: 40-mm Φ single-screw extruder (barrel temperature: 220° C.)

Adhesive resin layer: 32-mm Φ single-screw extruder (barrel temperature: 200° C.)

Heat-sealing resin layer: 40-mm Φ single-screw extruder (barrel temperature: 210° C.)

Die: feed block die (die temperature: 230° C.)

Cooling roll temperature: 50° C.

<Laminating of Multilayer Film and Base Film>

The base film and the multilayer film obtained above were dry-laminated to each other using an adhesive for dry laminating (main component "TM-242A", manufactured by Toyo-Moton, Ltd.; hardener "CAT-RT37L", manufactured by Toyo-Moton, Ltd.; the main component/the hardener/ethyl acetate 17/1.5/19.2), thereby producing a laminate.

(Laminating Conditions)

Laminating in a 20° C. environment, followed by 48-hour aging at 40° C.

The laminate obtained was subjected to the following evaluation.

[Gas Barrier Property After Bending Test]

A piece having a square shape of 10 cm×10 cm was cut out of the laminate obtained above, and the piece was folded into two and then unfolded. This laminate piece was examined for oxygen permeability (23° C.; inside, 100% RH; outside, 50% RH) using an oxygen gas permeability measuring device (OX-TRAN 2/21, manufactured by MOCON Inc.). The results thereof are shown in Table 6.

Comparative Example 2-1

In place of the laminate used in Example 2-1, a laminate was obtained from a PET film (12 μm) coated with vapor-deposited alumina (GL•ARH, manufactured by Toppan Printing Co., Ltd.), a nylon (15 μm) (Emblem ONMB-RT, manufactured by Unichika, Ltd.), and biaxially stretched polypropylene (60 μm) (Torayfan NOZK-207, manufactured by Toray Advanced Film Co., Ltd.) by performing dry laminating between the PET and the nylon and between the nylon and the polypropylene using the same adhesive for dry laminating as in Example 2-1. The laminate obtained was evaluated in the same manner as in Example 2-1. The results thereof are shown in Table 6.

TABLE 6

| | Oxygen permeability (cc/m$^2$day · atm) | |
| --- | --- | --- |
| | Before bending tes | After bending test |
| Example 2-1 | 0.5 | 0.5 |
| Comparative Example 2-1 | 0.1 | 0.6 |

It can be seen from the results that the laminate which included polyamide resin layers, EVOH layer, and heat-sealing resin layer that had been disposed over one surface of the base film and in which the polyamide resin layers adjoined both surfaces of the EVOH layer showed no change in oxygen permeability through the bending test and stably showed high gas barrier properties.

Example 2-2

As a base film (A), use was made of a stretched polyethylene terephthalate) film manufactured by Futamura Chemical Co., Ltd. (grade, FE2001A; thickness, 12 μm).

As polyamide resins (B1) and (B2), use was made of nylon-6 "UBE Nylon" (grade: 1022B), manufactured by Ube industries, Ltd.

As an EVOH (C), use was made of an EVOH having an ethylene content of 29.4% by mole, a degree of saponification of 99.7% by mole, and an MFR of 5.2 g/10 min (230° C.; load, 2,160 g).

As a heat-sealing resin (D), use was made of polypropylene "Novatec PP" (grade: BC6DF), manufactured by Japan Polypropylene Corp.

As an adhesive resin, use was made of polypropylene-based adhesive resin "Plexar" (grade: 6002), manufactured by LyondellBasell NV.

[Production of Laminate]

First, a multilayer film was produced, and this multilayer film was laminated to the base film to thereby produce a laminate (see Table 7).

<Production of Multilayer Film>

Films were formed by the T-die extrusion method to obtain a multilayer film composed of [first polyamide resin layer (15 μm) formed from polyamide resin (B1)]/[EVOH layer (10 μm)]/[second polyamide resin layer (15 μm) formed from polyamide resin (B2)]/[adhesive resin layer (5 μm)]/[heat-scaling resin layer (55 μm)].

(Film Forming Conditions)

First polyamide resin layer: 40-mm Φ single-screw extruder (barrel temperature: 220° C.)

EVOH layer: 40-mm Φ single-screw extruder (barrel temperature: 230° C.)

Second polyamide resin layer: 40-mm Φ single-screw extruder (barrel temperature: 220° C.)

Adhesive resin layer: 32-mm Φ single-screw extruder (barrel temperature: 200° C.)

Heat-sealing resin layer: 40-mm Φ single-screw extruder (barrel temperature: 210° C.)

Die: feed block die (die temperature: 230° C.)

Cooling roll temperature: 50° C.

<Laminating of Multilayer Film and Base Film>

The base film and the multilayer film Obtained above were dry-laminated to each other using the same adhesive for dry laminating as in Example 2-1, thereby producing a laminate.

(Laminating Conditions)

Laminating in a 20° C. environment, followed by 48-hour aging at 40° C.

The laminate obtained was subjected to the following evaluation.

[Gas Barrier Property After Hot-Water Treatment]

A piece having a square shape of 10 cm×10 cm was cut out of the laminate obtained above, and the piece was subjected to 30-minute retort processing at 120° C. using a device for retort processing (manufactured by Hisaka Works, Ltd.). Thereafter, the laminate piece was taken out and examined for oxygen permeability (23° C.; inside, 100% RH; outside, 50% RH) using an oxygen gas permeability measuring device (OX-TRAN 2/21, manufactured by MOCON Inc.).

Example 2-3

A laminate was produced in the same manner as in Example 2-2, except that the thicknesses of the polyamide resin layers and EVOH layer were changed to the thicknesses shown in Table 7. This laminate was evaluated in the same manner as in Example 2-2.

Comparative Example 2-2

A laminate was produced in the same manner as in Example 2-2, except that the thicknesses of the polyamide resin layers and EVOH layer and the layer configuration were changed to the thickness and the configuration as shown in Table 8, and that polypropylene ("Novatec PP" (grade: BC6DRF), manufactured by Japan Polypropylene Corp.) was used as another resin layer. This laminate was evaluated in the same manner as in Example 2-2.

The films were formed under the following conditions.
(Film Forming Conditions)
- EVOH layer: 40-mm Φ single-screw extruder (barrel temperature: 230° C.)
- Adhesive resin layer: 32-mm Φ single-screw extruder (barrel temperature: 200° C.)
- Another resin layer: 40-mm Φ single-screw extruder (barrel temperature: 210° C.)
- Heat-sealing resin layer: 40-mm Φ single-screw extruder (barrel temperature: 210° C.)
- Die: 4-resin 5-layer type feed block die (die temperature: 230° C.)
- Cooling roll temperature: 50° C.

The results of evaluation of Examples 2-2 and 2-3 and Comparative Example 2-2 are summarized in Table 9.

TABLE 7

| | Base film (μm) | Polyamide resin layer (μm) | EVOH layer (μm) | Polyamide resin layer (μm) | Adhesive resin layer (μm) | Heat-sealing resin layer (μm) |
|---|---|---|---|---|---|---|
| Example 2-2 | 12 | 15 | 10 | 15 | 5 | 55 |
| Example 2-3 | 12 | 5 | 30 | 5 | 5 | 55 |

TABLE 8

| | Base film (μm) | EVOH layer (μm) | Adhesive resin layer (μm) | Another resin layer (μm) | Adhesive resin layer (μm) | Heat-sealing resin layer (μm) |
|---|---|---|---|---|---|---|
| Comparative Example 2-2 | 12 | 40 | 10 | 10 | 10 | 30 |

TABLE 9

| | Oxygen permeability (cc/m²day · atm) | | | | |
|---|---|---|---|---|---|
| | After 6 hr | After 24 hr | After 36 hr | After 48 hr | After 60 hr |
| Example 2-2 | 85.3 | 25.7 | 7.3 | 4.6 | 4.0 |
| Example 2-3 | 81.0 | 30.5 | 9.0 | 5.2 | 4.4 |
| Comparative Example 2-2 | 115.8 | 97.6 | 63.1 | 22.4 | 4.9 |

It can be seen from the results that in cases when polyamide resin layers have been disposed so as to adjoin both surfaces of an EVOH layer, the rate of gas barrier property recovery after retort processing is high.

A comparison between Example 2-2 and Example 2-3 shows that in laminates including an EVOH layer and polyamide resin layers adjoining both surfaces of the EVOH layer, the reduction in the ratio (Tc/Tbx) between the thickness of the EVOH layer and the total thickness (Tbx) of the polyimide resin layers resulted in an increase in the rate of gas barrier property recovery after retort processing.

While the invention has been described in detail and with reference to specific embodiments thereof, it will be apparent to one skilled in the art that various changes and modifications can be made therein without departing from the spirit and scope thereof. This application is based on Japanese patent applications filed on Apr. 20, 2015 (Application No. 2015-086244 and Application No. 2015-086245), the contents thereof being incorporated herein by reference.

INDUSTRIAL APPLICABILITY

The stand-up pouch according to the invention can stably retain both gas bather properties after retort processing and high gas barrier properties, and is excellent in terms of suitability for filling and packaging the contents, retention of the quality of the contents, etc. Consequently, this pouch is useful as stand-up pouches for packaging therein various kinds of beverages and foods including cooked feeds, fish-paste products, frozen foods, stewed foods, rice cake, soup, seasonings, potable water, and others.

DESCRIPTION OF THE REFERENCE NUMERALS

1 Base film
2 Polyamide resin layer
3 EVOH layer
4 Heat-sealing resin layer
5 Stand-up pouch
6 Body sheet
7 Bottom sheet
8 Bottom seal part
9 Side seal part

The invention claimed is:
1. A stand-up pouch for retort comprising:
a laminate which comprises a base film and, disposed over one surface of the base film, a polyamide resin layer, a saponified ethylene-vinyl ester copolymer layer, and a heat-sealing resin layer,
wherein the polyamide resin layer adjoins the saponified ethylene-vinyl ester copolymer layer,
wherein a ratio (Tc/Tb) between a thickness (Tc) of the saponified ethylene-vinyl ester copolymer layer and a thickness (Tb) of the polyamide resin layer is 0.02 to 0.9,
wherein a thickness of the polyamide resin layer is more than 10 μm and less than or equal to 80 μm, and the polyamide is nylon 6,
wherein a thickness of the saponified ethylene-vinyl ester copolymer layer is 1-35 μm,
wherein the saponified ethylene-vinyl ester is a saponified ethylene-vinyl ester of which the ethylene content is 20-60% by mole, the degree of saponification of the saponified ethylene-vinyl ester is 90-100% by mole, and the melt flow rate (MFR) is 0.5-100 g/10 min,
wherein the base film is a polyester resin film, and
wherein a heat-sealing resin which constitutes the heat-sealing resin layer is polypropylene.

2. The stand-up pouch for retort according to claim 1, comprising:
the polyamide resin layer between the base film and the saponified ethylene-vinyl ester copolymer layer.

3. The stand-up pouch for retort according to claim 1, further comprising a second polyamide resin layer, and wherein the polyamide resin layers adjoin both surfaces of the saponified ethylene-vinyl ester copolymer layer.

4. The stand-up pouch for retort according to claim 1, wherein the ratio (Tc/Tb) between a thickness (Tc) of the saponified ethylene-vinyl ester copolymer layer and a thickness (Tb) of the polyamide resin layer is 0.333 to 0.666.

5. The stand-up pouch for retort according to claim 1, wherein the ratio (Tc/Tb) between a thickness (Tc) of the saponified ethylene-vinyl ester copolymer layer and a thickness (Tb) of the polyamide resin layer is 0.02 to 0.666.

6. A stand-up pouch for retort comprising:
a laminate which comprises a base film and, disposed over one surface of the base film, a polyamide resin layer, a saponified ethylene-vinyl ester copolymer layer, and a heat-sealing resin layer,
wherein the polyamide resin layer adjoins the saponified ethylene-vinyl ester copolymer layer,
wherein a ratio (Tc/Tb) between a thickness (Tc) of the saponified ethylene-vinyl ester copolymer layer and a thickness (Tb) of the polyamide resin layer is 0.02 to 0.9,
wherein a thickness of the polyamide resin layer is more than 10 μm and less than or equal to 80 μm, and the polyamide is nylon 6,
wherein a thickness of the saponified ethylene-vinyl ester copolymer layer is 1-35 μm, and
wherein the saponified ethylene-vinyl ester is a saponified ethylene-vinyl ester of which the ethylene content is 20-60% by mole, the degree of saponification of the saponified ethylene-vinyl ester is 90-100% by mole, and the melt flow rate (MFR) is 0.5-100 g/10 min,
wherein the stand-up pouch for retort exhibits an improvement in oxygen permeability from after 6 hours to after 24 hours after retort processing of 34.5% or higher, and
wherein the base film is a polyester resin film, and
wherein a heat-sealing resin which constitutes the heat-sealing resin layer is polypropylene.

* * * * *